March 17, 1936.  R. R. NYDEGGER  2,034,267
STRAND TENSION CONTROL MECHANISM
Filed April 23, 1934
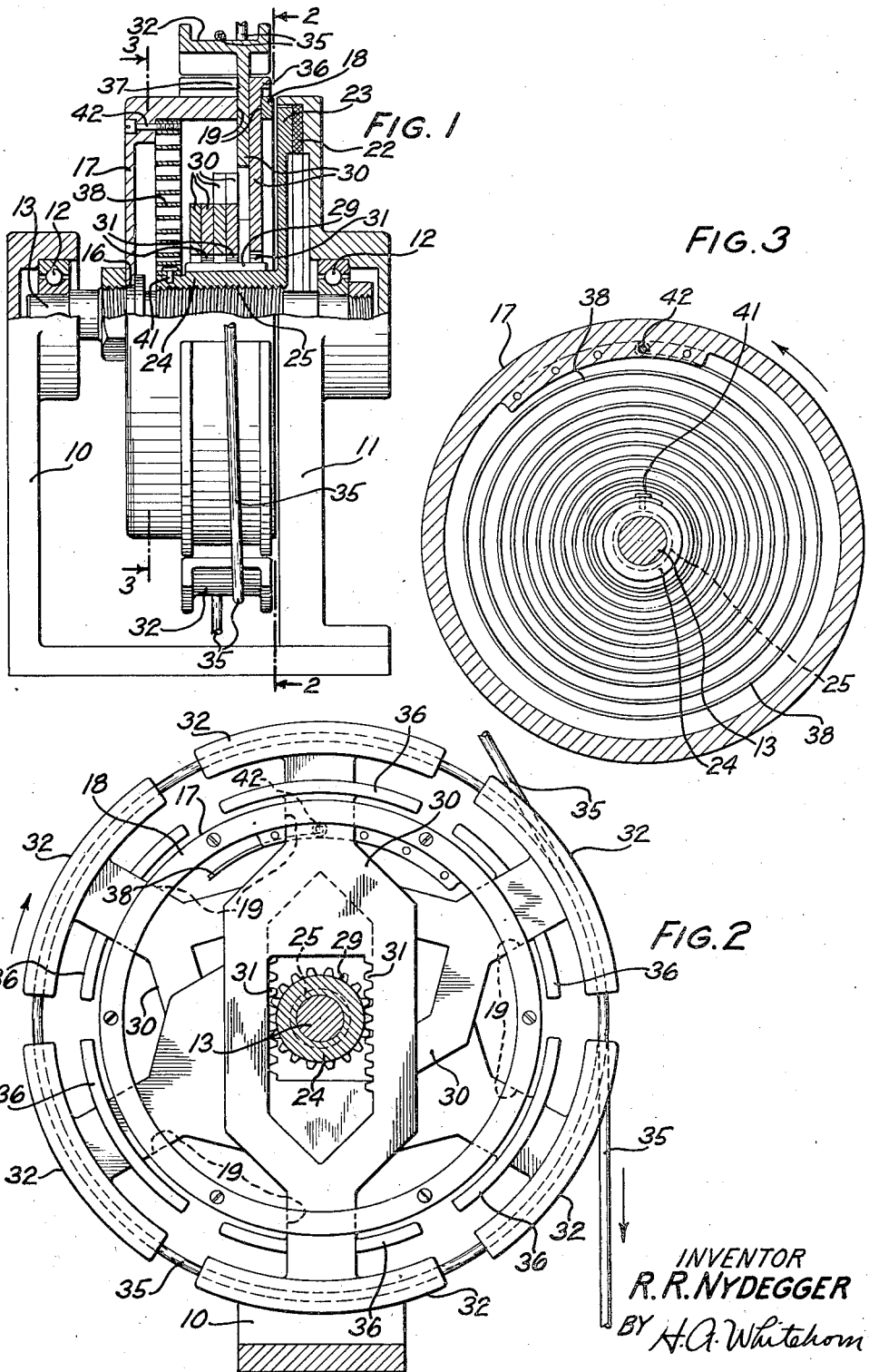
INVENTOR
R. R. NYDEGGER
BY H. A. Whitehorn
ATTORNEY Patented Mar. 17, 1936

2,034,267

UNITED STATES PATENT OFFICE 2,034,267

STRAND TENSION CONTROL MECHANISM

Roland R. Nydegger, Baltimore, Md., assignor to Western Electric Company, Incorporated, New York, N. Y., a corporation of New York Application April 28, 1934, Serial No. 722,897

10 Claims. (Cl. 242—155)

This invention relates to strand tension control mechanisms, and more particularly to a mechanism for maintaining a traveling strand under a substantially uniform predetermined tension.

An object of this invention is to provide a simple and efficient mechanism for controlling the tension on a traveling strand.

One form of mechanism embodying the features of this invention as adapted for controlling the tension on a wire or strand on its way from a supply source to a servicing or take-up point comprises a sheave-like member which carries a plurality of radially movable shoes, spring actuated in an outward direction, about which the strand is wrapped and driven by the advancement of the strand. Variations in the tension of the traveling strand cause the shoes to move radially and this motion is integrated and transmitted to spring pressed friction brake members which control the torque required to drive the sheave-like member, the pressure between the brake members being varied to maintain the strand under a substantially uniform predetermined tension. The elements of the mechanism are arranged in such a manner that the operation thereof is not affected by centrifugal forces resulting from its rotation, with the result that the mechanism may be rotated about any axis at any angle to its own axis of rotation.

The invention will be more clearly understood by referring to the following detailed description, read in conjunction with the accompanying drawing forming a part thereof, in which Fig. 1 is a front elevational view of a strand tension control mechanism, partly in section, embodying the features of the invention;

Fig. 2 is a fragmentary vertical section taken on the line 2—2 of Fig. 1, and

Fig. 3 is a fragmentary vertical detail section taken on the line 3—3 of Fig. 1.

Referring now to the drawing, and particularly to Fig. 1, the numerals 10 and 11 indicate stationary standards or frames which carry at upper spaced portions thereof roller bearings 12 in which are supported opposite ends of a rotary shaft 13, which is secured from longitudinal movement. Fixed to the shaft 13, as indicated at 16, is a cup-shaped housing 17 carrying a retaining ring 18 at its open or right end (Fig. 1). The peripheral wall of the housing 17 and the ring 18 along their abutting annular surfaces are suitably notched or formed to provide six circumferentially equally spaced slots 19, each pair of diametrically opposite slots being in radial alinement, but horizontally spaced from each other along the housing 17 and the ring 18. Secured to the inner surface of the standard 11 (Fig. 1) is an annular friction brake member 22 which is engaged under spring pressure, as will presently be described, with a rotary annular thrust plate or friction brake member 23, a hub 24 thereof having formed on its inner periphery a left hand screw thread 25 which is engaged with a similar thread formed on that portion of the periphery of the shaft 13 within the housing 17. Formed on the periphery of the thrust plate hub 24 is a spur gear 29.

Slidably carried in each pair of diametrically opposite slots 19 of the housing 17 is a pair of hollow abutting bars 30 through which the shaft 13 and the hub 24 extend. Each of the bars 30 upon an inner surface thereof is provided with a gear rack 31, the gear racks upon each pair of bars carried in each pair of diametrically opposite slots 19 being arranged to mesh with opposite sides of the gear 29 so that when the paired bars are moved either inwardly or outwardly they will act in unison to rotate the gear 29 in counter-clockwise and clockwise directions, respectively, as viewed in Fig. 2. Each of the bars 30 is provided at one end with a channel-shaped segment or shoe 32 disposed outside of the housing 17, the several shoes and the housing 17 forming a sheave-like member around which a wire 35, extending between a supply source and a servicing or take-up point, is wrapped once around, as shown in Fig. 2. At its opposite end each bar 30 is formed with a segment 36 which is arranged inside the shoe 32 of its companion bar and normally in spaced relation with the latter, and the peripheral surface of the housing 17 and the ring 18, the surfaces of the latter serving as a stop surface to limit the inward movement of the shoes. The segment 36 of each bar 30 is notched as indicated at 37 (Fig. 1) for the purpose of assembling its companion bar in abutting relation, as shown. The several pairs of bars 30 are retained in the slots 19 of the housing 17 by the ring 18, which is removably secured to the housing.

It is to be understood that each pair of companion bars serve in the operation of the mechanism in an identical capacity, although differing slightly in construction due to their individual spacing along the gear 29 with their shoes and segments in common alinement around the housing 17.

The housing 17 is yieldably connected to the rotary friction brake member 23 by a long spiral spring 38 which at its inner end is secured to the hub 24 of the brake member, as indicated by the numeral 41 (Figs. 1 and 3), its outer end being secured to the housing 17 by a screw 42. For the sake of simplicity only a fragment of the spring 38 is shown in Fig. 2. The spring 38 is tensioned in such a manner that it normally tends to rotate the hub 24 of the brake member 23 in a counterclockwise direction, as viewed in Fig. 3, and due to its left hand screw thread 25 engaging the similar thread upon the shaft 13 it will tend to travel toward the right, as viewed in Fig. 1, and consequently the brake member 23 will be maintained in engagement with the stationary brake member 22 under a predetermined pressure. The tension of the spring 38 may be adjusted and thereby the torque required to drive the sheave-like member comprising the housing 17 and the shoes 32, etc., may be controlled by removing the screw 42 from one aperture and inserting it in either of the companion apertures (Figs. 2 and 3), which it will be apparent will vary the action of the spring and consequently the pressure between the rotary and stationary brake members 23 and 22, respectively, the tension of the spring being adjusted in accordance with the desired tension to which a traveling strand is to be subjected.

In the operation of the above described tension controlling mechanism with the wire 35 wrapped once around the sheave shoes 32 and traveling between supply and take-up spools (not shown), in the direction of the arrow (Fig. 2), it will be obvious that the tension in the wire between the several shoes will produce radial pressures. These radial pressures are integrated and act counter to the tension of the spiral spring 38 which normally tends to move the shoes outwardly. Any movement of the shoes 32 inwardly, by means of the gear racks 31 of each pair of companion bars 30, which are arranged upon opposite sides of the gear 29, effects a counterclockwise rotation, about the shaft 13, of the hub 24 of the rotary thrust plate or friction brake member 23, as viewed in Fig. 2, against the action of the spiral spring 38, and due to the left hand screw thread mounting of the hub on the similarly threaded shaft 13 the brake member 23 will travel toward the left, as viewed in Fig. 1, thereby decreasing the pressure or braking effect thereof on the stationary friction brake member 22.

For example, let it be assumed that the tension on the wire 35 required to rotate the supply spool in drawing the wire therefrom equals one pound and after wrapping the wire around the sheave-like member and drawing it from the supply spool it is desired to wind the wire on the take-up spool under a tension equal to three pounds. In this case the tension of the spiral spring 38 will be adjusted, in the manner previously described, so that the combined action of the wire 35 upon the several shoes 32 and the frictional reaction of the rotary thrust plate or friction brake member 23 from the stationary brake member 22 will produce the desired tension. This is simply a matter of trial and error. When the desired tension is secured and thereafter, for example, the tension at the supply spool increases sufficiently to equal two pounds, and assuming no change in the position of the shoes 32, the tension on the wire at the take-up spool will be equal to four pounds. Immediately upon this increased tension occurring each of the shoes 32 will be subjected to an increased pressure by the wire wrapped therearound and will move radially inwardly and the radial pressures of the wire upon the several shoes will be integrated. The combined action of the gear racks 31 rotates the gear 29 about the shaft 13 against the action of the spiral spring 38 and in the manner previously described decreases the pressure of the thrust plate or friction brake member 23 upon the stationary friction brake member 22.

Since the spiral spring 38 has a very small tension increment for a given deflection and since the inward movement of the shoes 32 will be very small, the increased tension upon the wire 35, equal to four pounds at the take-up spool, will be reduced to the desired tension equal to three pounds. In the case of the tension on the wire 35 at the take-up spool being decreased below the desired tension, the shoes 32 will move outwardly in response to the action of the spiral spring 38. This movement of the shoes 32 in a manner reverse to that described in connection with an increase in the tension on the wire 35 above the desired tension, wherein the shoes are moved inwardly, causes the rotary thrust plate or friction brake member 23 to bear with greater pressure against the stationary friction brake member 22, thereby increasing the torque required to drive the sheave-like member and consequently increasing the tension on the wire until the desired tension is reached.

It will be apparent in the case of the above example of wire tensions that as long as the tension on the wire 35 at the supply spool is less than three pounds, the tension on the wire at the take-up spool will be equal to three pounds. Also that the last mentioned tension can be greater than the first mentioned tension because of the interposed stationary friction brake member 22 and the coefficient of friction which keeps the wire 35 from slipping on the shoes 32.

The herein described tension controlling mechanism in use maintains a substantially uniform predetermined tension on a wire traveling between supply and take-up spools in spite of the varying diameter and weight of the supply spool, inertia at starting, momentum at stopping, and the intermittent, irregular or jerky speed at which the wire may be withdrawn therefrom, and without stretching or breaking the wire or injuring the coating, covering, or insulation thereof.

This mechanism has a wide field of applications for controlling the tension on a wire or strand traveling from a supply source to a servicing or take-up point due to its novel arrangement of elements and construction. For instance, the mechanism may be mounted in a machine which will cause it to be rotated about any axis at any angle to its own axis of rotation. In the case of the mechanism being rotated about an axis parallel to its horizontal axis, the diametrically opposite shoes 32 will be thrown in the same direction by centrifugal force. Since the diametrically opposite shoes 32 act on opposite sides of the gear 29 and all the shoes 32 and elements associated therewith are of equal weight no rotation of the gear is effected because the forces acting on opposite sides thereof are equal.

Although there is herein shown and described one particular embodiment and application of the invention, it should be understood that the invention may take various other forms, and is capable of other applications within the scope of the appended claims.

What is claimed is:

1. In a mechanism for maintaining a substantially uniform tension on a strand traveling between two points, a rotary member about which the strand is wrapped and having a contractable and expansible peripheral surface, and means responsive to contractions and expansions of said surface for controlling the tension in said strand.

2. In a mechanism for maintaining a substantially uniform tension on a strand traveling between two points, a rotary member carrying a plurality of elements movable thereon forming a sheave-like member about which the strand is wrapped and driven by the advancement of the strand, and means operable in response to movements of said elements on said member caused by tension variations on the strand for controlling the torque required to drive said member and thereby the tension on the strand.

3. In a mechanism for maintaining a substantially uniform tension on a strand traveling between two points, a rotary member having a plurality of elements movable radially thereon forming a sheave-like member about which the strand is wrapped and driven by the advancement of the strand, and means including a friction brake operable in response to radial movements of said elements on said member caused by tension variations on the strand for controlling the torque required to drive said member and thereby the tension on the strand.

4. In a mechanism for maintaining a substantially uniform tension on a strand traveling between two points, a rotary member, a plurality of elements yieldably mounted for radial movement on said member and provided with outer strand engaging portions forming a sheave-like member about which the strand is wrapped and driven by the advancement of the strand, and means operable in response to radial movements of said elements on said member caused by tension variations on the strand for controlling the torque required to drive said member and thereby the tension on the strand.

5. In a mechanism for maintaining a substantially uniform tension on a strand traveling between two points, a rotary member carrying a plurality of elements movable thereon forming a sheave-like member about which the strand is wrapped and driven by the advancement of the strand, movable and stationary friction brake members, and a yieldable motion transmitting mechanism connecting said elements with said movable brake member and operable in response to movements of the elements on said member as the tension on the strand varies for moving the movable brake member longitudinally of its axis to vary the pressure between said brake members for controlling the torque required to rotate the sheave-like member and thereby the tension on the strand.

6. In a mechanism for maintaining a substantially uniform tension on a strand traveling between two points, a rotary member, a plurality of elements radially movable on said member and provided with outer strand engaging portions forming a sheave-like member about which the strand is wrapped and driven by the advancement of the strand, friction brake members adapted to control the torque required to drive said member, means operatively associated with said elements and said brake members for yieldably holding said elements outwardly against the tension of the strand thereon and simultaneously maintaining the brake members engaged under a predetermined pressure, and means operable in response to radial movements of said elements on said member caused by tension variations on the strand to vary the pressure between said brake members for controlling the torque required to rotate the sheave-like member and thereby the tension on the strand.

7. In a mechanism for maintaining a substantially uniform tension on a strand traveling between two points, a rotary member carrying a plurality of elements movable thereon and arranged in pairs with the elements of each pair disposed at diametrically opposite points of said member and forming a sheave-like member about which the strand is wrapped and driven by the advancement of the strand, said elements carrying gear racks adjacent the axis of said member, a peripherally screw threaded element secured to and rotatable about the axis of said member, a friction brake member having a sleeve portion screw threaded along its inner periphery to receive said threaded element and provided upon its outer periphery with gear teeth engaging said gear racks of said plurality of elements, said gear racks of each pair of elements engaging opposite gear teeth of said sleeve portion, a stationary friction brake member, an elastic member operatively connected to said rotary member and with the sleeve portion of said friction brake member normally tending to rotate said brake member upon the threaded element to maintain it under predetermined pressure against said stationary brake member and simultaneously through the engaging gear racks and gear teeth yieldably holding said plurality of elements outwardly against the radial pressure of the traveling strand thereon and responsive to movements of said plurality of elements on said rotary member caused by tension variations on the strand for controlling the torque required to drive said member and thereby the tension on the strand.

8. In a mechanism for maintaining a substantially uniform tension on a strand traveling between two points, a rotary member carrying a plurality of radially movable elements thereon forming a sheave-like member about which the strand is wrapped and driven by the advancement of the strand, said elements arranged in pairs with the elements of each pair disposed at diametrically opposite points of said member and so interconnected that movement of one causes an equal and opposite movement of the other, and means operable in response to movements of said elements on said member caused by tension variations on the strand for controlling the tension on the strand.

9. In a mechanism for maintaining a substantially uniform tension on a strand traveling between two points, a rotary member carrying radially movable elements thereon forming a sheave-like member about which the strand is wrapped and driven by the advancement of the strand, one of said elements having an equalizing connection to a diametrically opposite element, whereby centrifugal force due to motion about an external axis is neutralized, and means operable in response to movements of said elements on said member caused by tension variations on the strand for controlling the tension on the strand.

10. In a mechanism for maintaining a substantially uniform tension on a strand traveling between two points, a rotary member carrying a plurality of pairs of radially movable elements slidably mounted thereon forming a sheave-like member about which the strand is wrapped and driven by the advancement of the strand, the elements of each pair being disposed at diametrically opposite points of said member, a central pinion, each of said elements having a rack engaging said pinion, and means operable in response to movements of said elements on said member and thereby said pinion caused by tension variations on the strand for controlling the tension on the strand.

ROLAND R. NYDEGGER.